US009289858B2

(12) United States Patent
Noel et al.

(10) Patent No.: US 9,289,858 B2
(45) Date of Patent: Mar. 22, 2016

(54) DRILLING HOLES WITH MINIMAL TAPER IN CURED SILICONE

(75) Inventors: Michael Shane Noel, Portland, OR (US); Todd C. SeCoy, Beatty, OR (US)

(73) Assignee: Electro Scientific Industries, Inc., Portland, OR (US)

( * ) Notice: Subject to any disclaimer, the term of this patent is extended or adjusted under 35 U.S.C. 154(b) by 653 days.

(21) Appl. No.: 13/331,472

(22) Filed: Dec. 20, 2011

(65) Prior Publication Data

US 2013/0154159 A1 Jun. 20, 2013

(51) Int. Cl.
*B23K 26/00* (2014.01)
*B23K 26/14* (2014.01)
*B23K 26/40* (2014.01)
*B23K 26/38* (2014.01)

(52) U.S. Cl.
CPC .......... *B23K 26/402* (2013.01); *B23K 26/388* (2013.01); *B23K 2203/42* (2015.10)

(58) Field of Classification Search
CPC ............... H23K 2203/0554; B23K 26/385; B23K 26/386; B23K 26/18; B23K 26/0039; B23K 26/4065; B23K 26/00; B23K 26/0006; B23K 26/362; B23K 26/384; B23K 26/388; B23K 26/402; H05K 3/0032; H05K 3/0035; H05K 3/0026; H05K 2201/09063; H05K 2201/0394
USPC .............. 219/121.6, 121.72, 121.61, 121.62, 219/121.8, 121.7, 121.67, 121.78, 121.79, 219/121.85, 121.81, 121.71, 121.68; 264/400; 425/174.4
See application file for complete search history.

(56) References Cited

U.S. PATENT DOCUMENTS

| | | | |
|---|---|---|---|
| 4,992,025 A | 2/1991 | Stroud et al. | |
| 5,593,606 A | 1/1997 | Owen et al. | |
| 5,731,047 A | 3/1998 | Noddin | |
| 5,841,099 A * | 11/1998 | Owen et al. | ............. 219/121.69 |
| 6,275,250 B1 * | 8/2001 | Sanders et al. | ................ 347/247 |
| 6,355,907 B1 | 3/2002 | Kuehnle et al. | |
| 6,433,301 B1 | 8/2002 | Dunsky et al. | |
| 6,610,960 B2 | 8/2003 | De Steur et al. | |
| 6,627,844 B2 | 9/2003 | Liu et al. | |
| 6,649,864 B2 | 11/2003 | De Steur et al. | |
| 6,897,405 B2 | 5/2005 | Cheng et al. | |
| 7,019,257 B2 | 3/2006 | Stevens | |
| 7,259,354 B2 | 8/2007 | Pailthorp et al. | |
| 2002/0153500 A1 * | 10/2002 | Fordahl et al. | ........... 250/559.29 |
| 2003/0180569 A1 | 9/2003 | Hamann et al. | |

(Continued)

FOREIGN PATENT DOCUMENTS

JP     2007207898 A  *  8/2007
WO    2009-120585 A2    10/2009

*Primary Examiner* — Hung D Nguyen
(74) *Attorney, Agent, or Firm* — Young Basile Hanlon & MacFarlane P.C.

(57) ABSTRACT

A laser machining system is used to precision laser drill holes in an elastomeric material, preferably silicone rubber, to form holes to support miniature electronic components temporarily while they are being processed or tested. The holes are formed by directing laser pulses from a laser to a top surface of the elastomeric material in a plurality of passes in a direction proceeding from a non-zero inner diameter to the desired diameter or from the desired diameter to the inner diameter. The plurality of passes forms a first pattern such that a successive pass of the plurality of passes overlaps a previous pass of the plurality of passes. The first pattern is repeated without changing direction or the first pattern is repeated while reversing the direction until the hole is formed through a bottom surface of the elastomeric material.

20 Claims, 4 Drawing Sheets

(56) References Cited

U.S. PATENT DOCUMENTS

| | | | |
|---|---|---|---|
| 2003/0201260 A1* | 10/2003 | Steur et al. | 219/121.71 |
| 2004/0016095 A1* | 1/2004 | Liu et al. | 219/121.71 |
| 2004/0017430 A1* | 1/2004 | Mizuyama et al. | 347/47 |
| 2004/0108304 A1* | 6/2004 | Swenson et al. | 219/121.69 |
| 2004/0164060 A1 | 8/2004 | Maeda et al. | |
| 2007/0278703 A1 | 12/2007 | Hardy et al. | |
| 2007/0291496 A1 | 12/2007 | Nashner et al. | |
| 2008/0024470 A1 | 1/2008 | Andre et al. | |
| 2008/0084404 A1 | 4/2008 | Andre et al. | |
| 2008/0093349 A1 | 4/2008 | Bruland et al. | |
| 2008/0272095 A1 | 11/2008 | Alpay et al. | |
| 2009/0242525 A1 | 10/2009 | O'Brien et al. | |
| 2009/0245302 A1 | 10/2009 | Baird et al. | |
| 2010/0126973 A1* | 5/2010 | Frye | 219/121.71 |
| 2010/0252540 A1 | 10/2010 | Lei et al. | |

* cited by examiner

FIG. 1
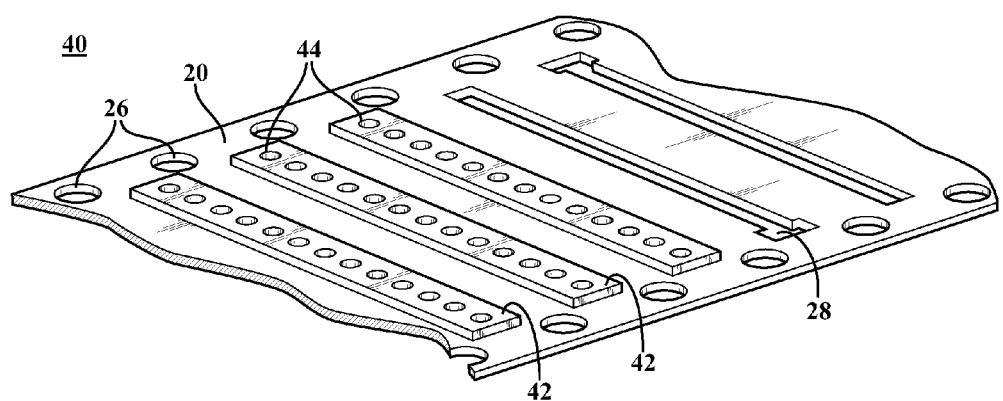
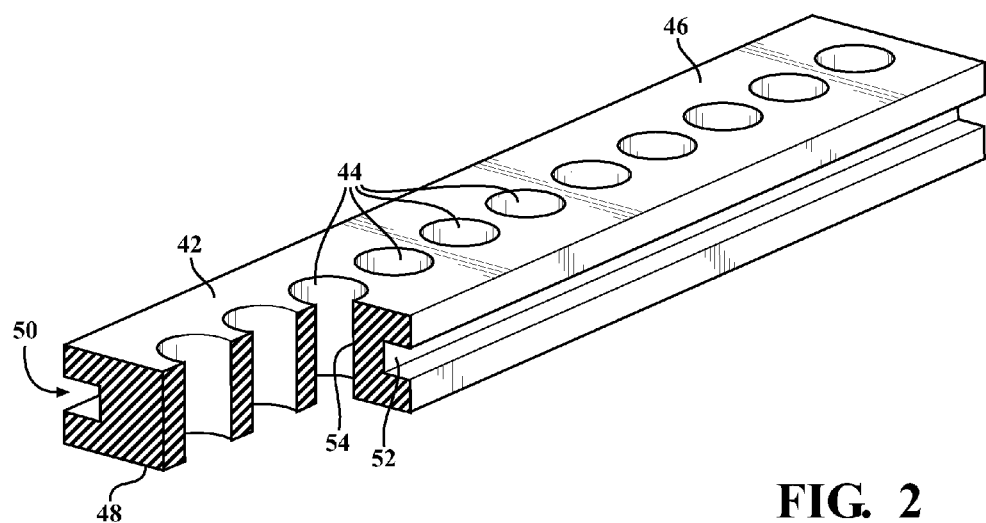
FIG. 2

DRILLING HOLES WITH MINIMAL TAPER IN CURED SILICONE

FIELD OF THE DISCLOSURE

The present disclosure relates to carriers for miniature electronic components and, in particular, to a laser-based method of forming dimensionally precise holes in an electronic component carrier to grip a miniature electronic component and hold it in a controlled orientation.

BACKGROUND

Advancing technology and market forces combine to make electronic products, such as computers and cell phones, smaller and more powerful as time passes and new models are introduced. In order to support this decrease in size and increase in power, electronic components are becoming smaller and more powerful. Examples of this trend can be found in the manufacture of passive electronic components such as resistors, capacitors and inductors.

SUMMARY

Embodiments are disclosed for manufacturing an electronic component carrier from an elastomeric material, such as silicone rubber plugs in a metallic belt. According to one method taught herein for drilling a hole in an elastomeric material to a desired diameter across a center, the method comprises directing laser pulses from a laser to a top surface of the elastomeric material in a plurality of passes in a direction proceeding from a non-zero inner diameter to the desired diameter or from the desired diameter to the inner diameter, the plurality of passes forming a first pattern such that a successive pass of the plurality of passes overlaps a previous pass of the plurality of passes, and repeating the first pattern without changing the direction or repeating the first pattern while reversing the direction until the hole is formed through a bottom surface of the elastomeric material.

Also disclosed are embodiments including an apparatus for drilling such a hole. One such embodiment comprises a laser, a memory and a processor. The processor is configured to execute instructions programmed in the memory to direct laser pulses from the laser to a top surface of the elastomeric material in a plurality of passes in a direction proceeding from a non-zero inner diameter to the desired diameter or from the desired diameter to the inner diameter, the plurality of passes forming a first pattern such that a successive pass of the plurality of passes overlaps a previous pass of the plurality of passes. In addition, the instructions include an instruction to repeat the first pattern without changing the direction or repeat the first pattern while reversing the direction until the hole is formed through a bottom surface of the elastomeric material.

Variations in these embodiments and other embodiments are described hereinafter.

BRIEF DESCRIPTION OF THE DRAWINGS

The description herein makes reference to the accompanying drawings wherein like reference numerals refer to like parts throughout the several views, and wherein:

FIG. 1 is a perspective view of a metallic tape with silicone rubber plugs according to a disclosed embodiment;

FIG. 2 is a cross-sectional view of a silicone rubber plug according to a disclosed embodiment;

DETAILED DESCRIPTION

Figure 6:
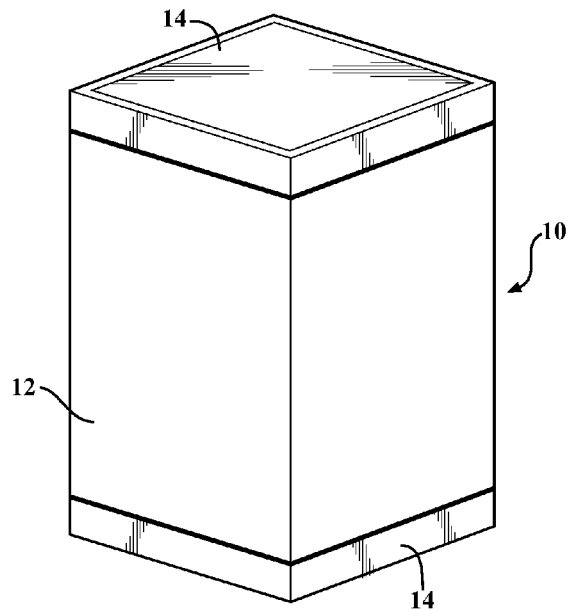
FIG. 6 is a perspective view of an electronic component.

FIG. 6 is an example of an electronic component 10, in this case a chip capacitor having a body 12 comprising layers of metallic conductors separated by a dielectric and covered in a ceramic or ceramic-like material and capped on each end with a metallic cap 14, each of which communicates with the internal metallic conductors. These components and other electronic components, particularly passive components, have been offered in smaller sizes as time passes to support increasing circuit densities. Commonly available sizes for passive electronic components range from 0.25×0.12 in (6.3× 3.0 mm) down to 0.016×0.008 in (0.41×0.20 mm). Component carriers able to hold the wide variety and range of available components accurately and efficiently without damage to the components during the manufacturing process are desired. Herein, deformable material, preferably silicon rubber, is precision laser drilled for a particular component size so as to permit the component to be easily inserted and held accurately and firmly in position by during a manufacturing step while permitting the component to be quickly and safely removed from the hole when the step is complete. Laser drilling the holes according to embodiments of this invention creates holes of a particular diameter with minimal taper in desired locations while minimizing damage to the material. Laser drilling such holes makes it advantageous to construct component carriers of different sizes and styles.

For example, one known component carrier that could be modified according to the teachings herein is that shown in US Patent Publication No. 2010/0206769 A1, which is assigned to the Assignee of the present invention. Therein, pins extend through holes in an underlying sheet of metal material. A deformable material is then supplied to the surface of the material to cast the material to the surface and to the surfaces of the holes. In another example, a component carrier could be formed of metallic belts with blank silicone rubber plugs that could be kept in stock, ready to be laser drilled whenever a new component carrier is required. Defining the holes by casting with pins is a time consuming process whenever a new component is presented and can result in a low yield of acceptable component carriers because of variance in the molding process. Laser drilling provides more flexibility in manufacturing with good precision and a greater yield.

Figure 7:
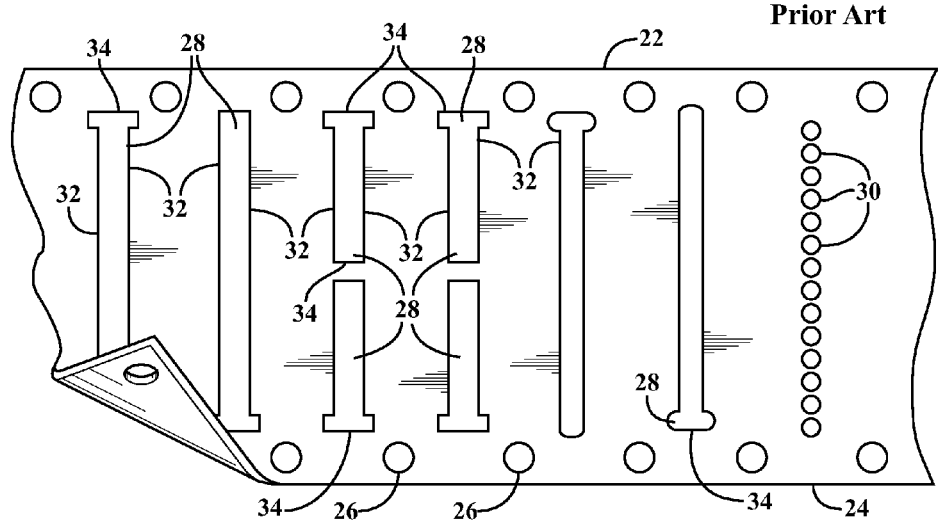
FIG. 7 is a plan view of a metallic tape.

FIG. 7 is an example of a metallic tape 20 prepared for use as an electronic component carrier before adding elastomeric plugs. Electronic component carriers are assemblies designed to temporarily hold multiple electronic parts in precise orientation and location during the manufacturing process. The carriers can be rectangular and hold the parts in a 2D array or be constructed as an endless belt. Tape 20 is formed from a flexible strip of stainless steel or other high strength metal that is approximately 0.13 mm (0.005 inches) thick and about 5.1 cm (2.0 inches) wide. Tape 20 is of an "endless" variety in that it has no beginning or end but is maneuvered about a series of pulleys and sprocket wheels between various processing stations. Tape 20 is defined by spaced-apart mutually parallel side margins 22 and 24 and includes a series of pilot or sprocket holes 26 that serve as drive perforations to receive drive stubs of drive sprocket wheels. Sprocket holes 26 are disposed adjacent to at least one and preferably both of side margins 22 and 24 and are uniformly space along the length of tape 20. FIG. 7 shows tape 20 formed with a variety of apertures of different shapes in which plugs can be inserted. Multiple apertures 28, 30 formed in discrete patterns are spaced along the length of tape 20, preferably positioned intermediate of side margins 22 and 24 and uniformly spaced. Apertures may be closely spaced round holes 30 or substantially rectangular shapes 28 defined by a pair of elongate parallel edges 32 terminated by a pair of short-end edges 34.

FIG. 1 is an example of a component carrier 40 comprised of metallic tape 20 with sprocket holes 26 and, in this case, rectangular apertures 28 having elastomeric plugs 42 with holes 44 formed according to an embodiment of this disclosure. Tape 20 could also have round apertures 30. Preferably, the elastomeric material is a silicone rubber material, but this is not necessary. In this example, plugs 42 have been cast in place around tape 20 so that as silicone rubber cures, the material comprising plugs 42 will harden above and below tape 20, thereby capturing tape 20 and keeping each plug 42 firmly attached.

FIG. 2 is a cross-sectional view of a silicone rubber plug 42 with holes 44 formed according to an embodiment of this disclosure. Plug 42 has a top surface 46 and an opposing bottom surface 48 and elongate slots 50 and 52 where parallel edges 32 of tape 20 are captured. Note that holes 44 are smaller in diameter than the distance between elongate slots 50 and 52, thereby providing silicone rubber material 54 between tape 20 and holes 44, thereby insuring compliance of material 54, which aids in holding an electronic component securely.

Figure 3:
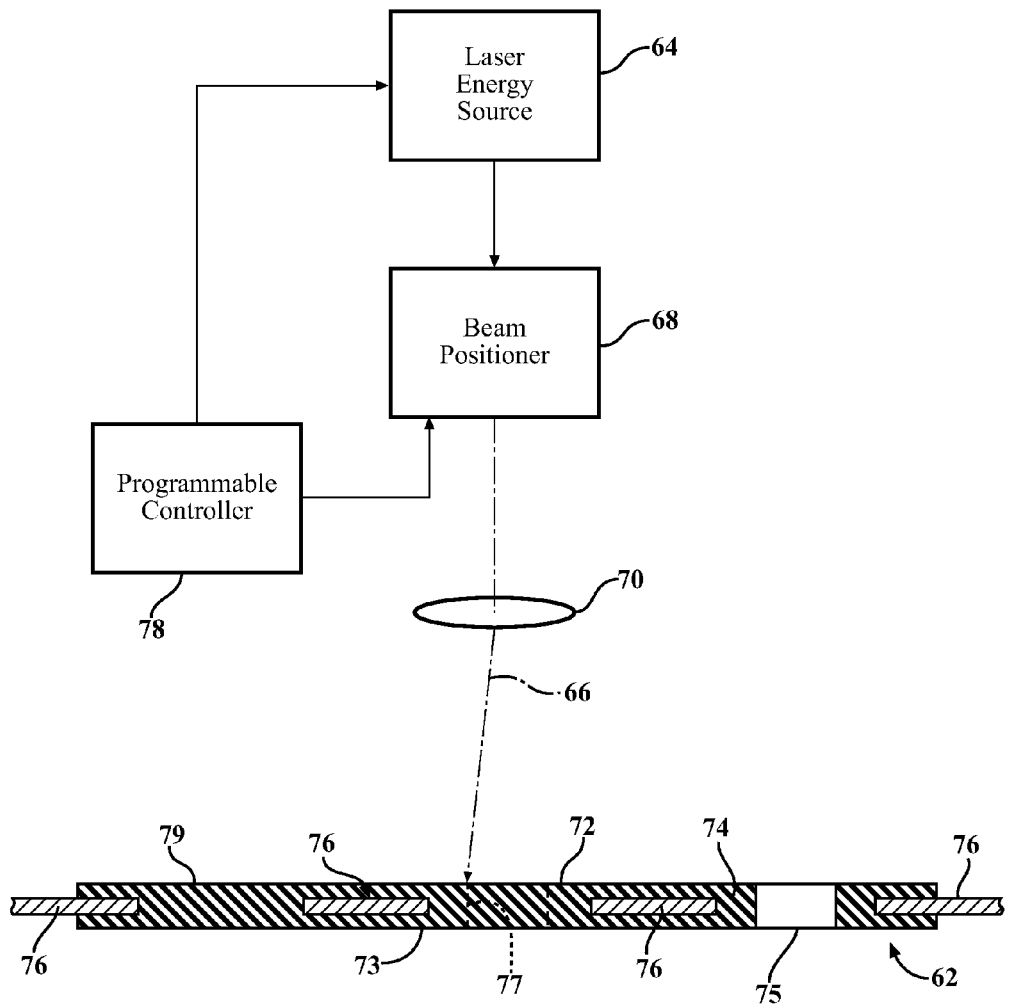
FIG. 3 is a simplified plan view of a laser processing system implementing laser drilling as described herein.

FIG. 3 is a laser processing system 60 that is configured to process an electronic component carrier 62 (shown in cross-section) according to embodiments of this disclosure. An example of a laser processing system that can be adapted to embody this disclosure is the MM5330 Laser Micromachining System, manufactured by Electro Scientific Industries, Inc. of Portland, Oreg. In this example, laser processing system 60 comprises a laser source 64 that emits laser pulses 66. Laser pulses 66 are directed by beam positioner 68 through field optics 70 to impinge a top surface 72 of an elastomeric plug 74 that has been molded around a metallic tape 76, all under the direction of a programmable controller 78. Controller 78 may be a computer with memory such as read-only memory (ROM), random-access memory (RAM) or other memory on which instructions in the form of a software program are stored and a processor such as a central processing unit (CPU) configured to execute instructions stored in the memory (e.g. to operate the software program) to perform laser drilling as described hereinafter. Controller 78 is described as programmable for this reason. Other arrangements for laser processing system 60 can be used.

FIG. 3 shows a completed hole 75, a hole 77 being drilled and a position 79 where a hole is to be drilled 79. Electronic component carrier 62 is positioned with respect to laser processing system 60 according to known techniques, at which point programmable controller 78 directs laser source 64 to emit pulses 66 directed by beam positioner 68 through field optics 70 in a pattern that removes material to form the desired hole. Beam positioner 68 may comprise galvanometers or other optical devices controlled by programmable controller 78 that rapidly and accurately direct the laser pulses in programmable patterns through top surface 72 to create holes 75, 77 extending from top surface 72 to the opposite surface having a desired diameter. Field optics 70 direct the pulses to impinge top surface 72 from a direction substantially perpendicular to top surface 72 to permit the laser pulses to properly shape holes 75, 77 in this example, but this is not necessary.

In one embodiment, laser source 64 comprises a $CO_2$ laser operating in the infrared (IR) region and having parameters that include an output wavelength of about 10.6 microns and power of between about 5 Watts and 50 Watts, more preferably about 15 Watts. Alternative $CO_2$ lasers, such as those having an output wavelength such as 9.2 or 9.4 microns can be used. $CO_2$ lasers typically operate in CW or continuous wave mode. However, additional laser optics comprising an acousto-optic modulator (AOM) or the like can be added to laser source 64 to periodically interrupt the beam and create laser pulses. In this case, the duration of the laser pulses will be between about 1 microsecond and 100 microseconds, more preferably 20 microseconds, with a frequency or pulse repetition rate of between 1 kHz and 100 kHz, more preferably 10 kHz. This laser has a spatial laser spot size of about 80 microns on the surface of the workpiece to be laser machined. Other lasers could be used with the teachings herein. For example, ultraviolet (UV) lasers can laser drill holes in silicone rubber. However, such a laser may change the material color, which could be undesirable in certain applications, and doping of the material for higher absorption would generally be required. A laser operating in the IR region is preferable but not necessary as it obviates the need for doping and minimizes heat damage due to the increased absorption caused by doping.

Holes to support electronic components in the elastomeric material are desirably formed having a specified outer diameter that is based on the size of the components being supported. However, drilling holes through an elastomeric material with little or no taper is difficult, particularly though a thick part relative to the diameter of the holes. One possible method is to change the laser focus while forming the hole but drilling with one focus, then changing the focus and drilling again. In addition to requiring multiple steps and adjustments, such a process tends to generate a large amount of heat and can burn the material. Another option is to drill partway through one side, flip the carrier over, and drill the opposite side. This too involves multiple steps and has the additional problem of aligning the carrier precisely so that the holes drilled on each side meet each other so as to form smooth inner surfaces for the holes.

In contrast, the process of laser drilling described herein drills a hole with minimal taper through elastomeric material without requiring a flip in the position of the carrier or a change in focus of the laser. In this process, the diameter of the hole is greater than the diameter of the laser pulse, so laser pulses should be distributed in a pattern on the surface of the workpiece in order to remove material from the entire diameter of the hole. A spiral pattern is used herein having parameters such as outer diameter, inner diameter, spiral pitch and number of repetitions. Advantageously, a trepan pattern is also used, where the laser pulses are distributed in a decreasing or increasing diameter spiral or a series of concentric circles to remove the material.

Figure 4:
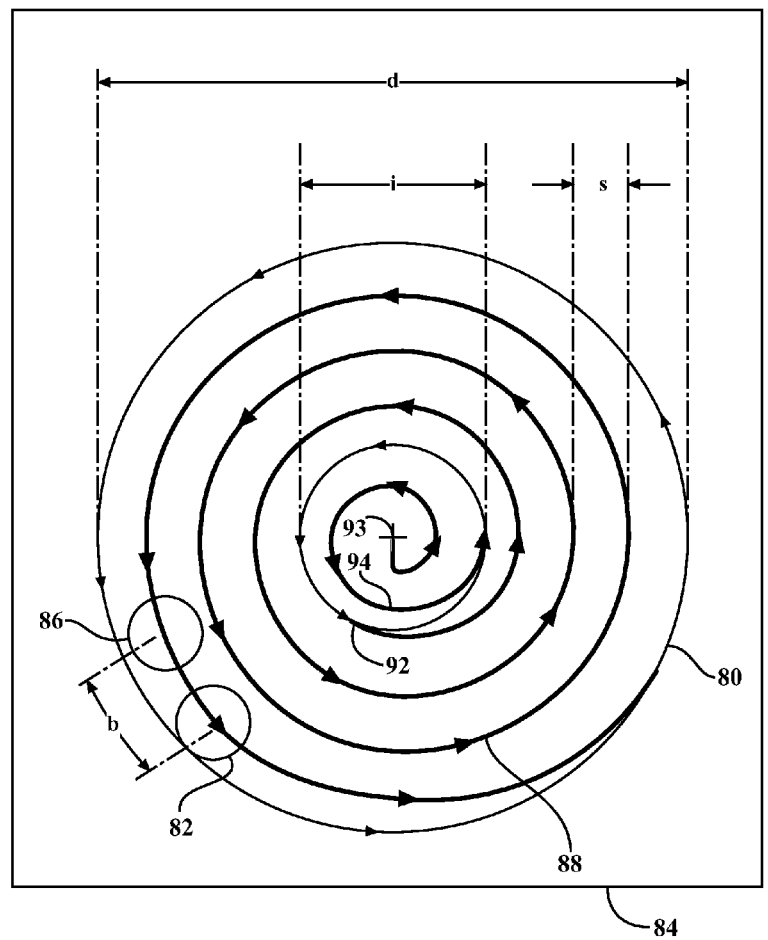
FIG. 4 is a top view of a hole laser drilled in silicone rubber according to disclosed embodiments.

For illustrative purposes, FIG. 4 shows the drilling path in one or more continuous spiral patterns so as to minimize or avoid damage of the material and excessive debris. In this example, a hole 80 is desired to be laser machined with diameter "d" using a laser spot 82 with particular radius in a workpiece 84, in this case a silicone rubber plug. Workpiece 84 can be relatively thick compared to the desired size of hole 80, or hole 80 can have a diameter on the same scale as the workpiece thickness. Hole 80 is desirably very round. For example, workpiece 84 can be 750-1500 microns thick, while hole 80 desirably has minimal taper of less than 25 microns. Diameter "d" of hole 80 ranges from, for example, one to two millimeters. FIG. 4 is not drawn to scale.

To drill workpiece 84, an inner diameter "i" should be defined. Inner diameter "i" is defined in such a way so that a pitch or step size "s" and a number of revolutions as described hereinafter result in a substantially straight (i.e., a minimally tapered) inner surface of hole 80. In embodiments where a relatively small hole is to be laser drilled, such as less than 1 mm, inner diameter "i" can be zero. In one embodiment, inner diameter "i" is more than half of diameter "d" of hole 80. More preferably, inner diameter "i" has a diameter that is about 80-90% of diameter "d", where inner diameter "i" is larger wherein diameter "d" is larger so that the difference between diameter "d" and inner diameter "i" does not change significantly as diameter "d" becomes larger. In this example, drilling begins by directing laser pulses to impinge workpiece 84 starting at a point located on inner diameter "i" and proceeds along a spiral path 88 to outer diameter "d". Optionally, a pass is made along the entire path of inner diameter "i" before proceeding along spiral path 88. Two adjacent laser pulses on spiral path 88 are indicated at 82 and 86. Laser processing system 60 begins pulsing and moving with respect to workpiece 84, delivering laser pulses 66 that perform laser machining of workpiece 84. The laser beam (the path along which laser pulses 66 propagate from laser source 64 to workpiece 84) is moved in a continuous fashion with respect to workpiece 84 so that laser pulses 66 are delivered to workpiece 84 at a consistent distance apart defined by bite size "b", which is the distance between successive laser pulses 66 and is a function of the pulse repetition rate and the speed of travel of the laser beam with respect to workpiece 84. Preferably, these successive pulses 66 are closely-spaced or contact each other. That is, in practice the bite size "b" can be less than spot size, and therefore pulses 66 will overlap. According to one embodiment, the laser beam so formed moves at a speed of about 375 mm/sec so that processing of a number of holes can be completed in a relatively short period of time.

As mentioned, laser pulses 66 move along spiral path 88 to the surface of workpiece 84 to remove material from hole 80 while increasing the radius of spiral path 88 by making the path larger by step size "s". This proceeds for a number of revolutions until the outer diameter 80 is reached. The number of revolutions should be selected so that step size "s" is relatively small with respect to both the spot size of laser pulses 66 and the difference between diameter "d" and inner diameter "i". In this example, the number of revolutions is three. More preferably, where hole 80 has a diameter between 1-2 mm, the number of revolutions is between five and ten where the spot size (e.g. diameter) of laser pulses 66 is 80 microns, the inner diameter is 800 microns, and the step size "s" is 5-15 microns. In many embodiments, step size "s" should not exceed 50 microns because too many revolutions can cause excessive taper. A step size "s" of smaller than about 5 microns can lead to too many revolutions that also result in too much taper. Using the teachings herein, larger holes such as holes of 5 mm or greater in size can be drilled.

Note that in FIG. 4, the line indicating spiral path 88 is the outer dimension of the spot size of laser pulses 66. For example, where laser pulses 66 form a generally uniform path for a round spot of a spot size greater than the step size "s" (e.g. 80 microns versus 5-50 microns), each revolution of spiral path 88 results in the removal of additional material from a previous revolution until the final path along diameter "d" is traversed. Optionally, laser pulses 66 can be formed into a trepan pattern progressing along spiral path 88. In such a case, laser pulses 66 are distributed in a decreasing or increasing diameter spiral or a series of concentric circles to remove the material along spiral path 88 where an outer diameter of laser pulses 66 forms along spiral path 88. This option requires more movement of laser processing system 60 relative to workpiece 84, but may be desirable with the inclusion of fast-moving optics. In this case, the spot size varies and refers to the diameter of the spiral or concentric path, not the diameter of the laser pulses 66 per se.

The pattern of spiral path 88 is repeated at least two times to remove the material all the way through workpiece 84. The number of repetitions of spiral path 88 depends in part upon the depth of workpiece 84, but also depends on the strength and spot size. Too many or too few repetitions can result in too much taper. Less than 10 and preferably no more than 6 repetitions are desirable for the exemplary holes described herein. Due to the overlapping spiral path 88 traversed by laser pulses 66, material removal is relatively fast, but local heating of the material that may result in damage to the silicone rubber is a concern. In general the rate of material removal is a function of laser parameters that are adjusted to provide a high rate of material removal while minimizing damage to the material from local heating and minimizing taper.

While the embodiment described above starts at inner diameter "i" and proceeds to diameter "d" for each repetition of spiral path 88 (so-called inside out), this is not necessary. Each repetition could progress from diameter "d" to inner diameter "i" by pitch or step size "s" (so-called outside in). Alternatively, each repetition could alternate between outside in and inside out. Moreover, path 88 does not have to be spiral—it could comprise concentric circles with pitch or step size "s".

Embodiments of this disclosure can also perform a two-step process, in which a plug having outside dimensions of inner diameter "i" is removed before proceeding with the repetitions of spiral path 88. Laser pulses 66 can proceed along a path 94, in this example a spiral path proceeding in a similar manner as that described above beginning with an inner diameter or central start point 93 and ending at the path 92 along inner diameter "d" of larger hole 80. Path 94 is repeatedly traversed, at least twice, generally with a large pitch of about 60 microns between adjacent paths to increase machining speed at the expense of hole sidewall quality. Path 94, like spiral path 88, can proceed inside out or outside in. Moreover, path 94 is not required to be a spiral path as shown. Path 94 can be a single circular path traversing along path 92 defined by inner diameter "i". Hole quality about inner diameter "i" is not particularly an issue in the two-step process since the outer diameter of the inner hole or plug is removed in the second step of the process that traverses from inner diameter "i" to diameter "d". This two-step process is particularly desirable when thicker materials are used for workpiece 84, such as greater than 1 mm, but it can also provide benefits when diameter "d" of hole 80 relatively large, such as those greater than 1 mm and up to about 2 mm. The first step in the two-step process is designed to remove material all the way through center 93 of hole 80 to create a through hole that permits debris generated by the second step of the process as described above to exit and to allow heat dissipation during processing along path 88. Inner diameter "i" is generally chosen to yield a number of passes between inner diameter "i" and outer diameter "d" at the desired step size to provide the desired quality while, when using the two-step process, maximizing the speed at which the plug is removed. This provides rapid and efficient drilling while maintaining desired hole quality at diameter "d".

Figure 5A:
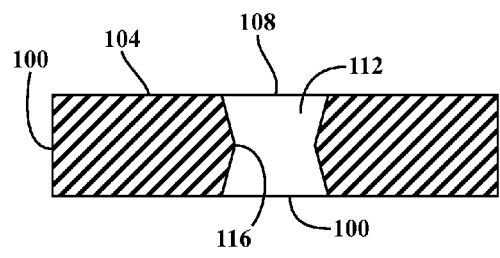
FIG. 5A is a cross-sectional view of a laser drilled hole.

FIG. 5A is a hole 112 formed according to an embodiment of this disclosure by laser drilling a hole extending from a top surface 104 to a bottom surface 106 of silicone rubber 100 in a two-step process as described above. Because of the laser parameters used to remove material described above, the process creates hole 112 as shown in FIG. 5A, where the difference between a top diameter 108 and a bottom diameter 110 is less than a desired amount. Generally, this difference is negligible such that the diameters can be considered equal. In addition, forming hole 112 in silicone rubber according to embodiments of this disclosure can leave a tapered area or "waist" 116 of un-removed material in hole 112, particularly where thicker materials are being drilled. In certain desirable embodiments, this tapered area 116 does not exist, and the diameter of hole 112 is substantially unchanged from top diameter 108 through bottom diameter 110. Where tapered area 116 exists, it should have minimal taper. That is, as compared to diameter "d", the diameter of hole 112 in tapered area 116 is preferably less than 2.5% different from diameter "d". For example, where diameter "d" is between 1-2 mm, tapered area 116 extends away from inner wall formed by top diameter 108 and bottom diameter 110 no more than 100 microns and preferably less than 25 microns.

Figure 5B:
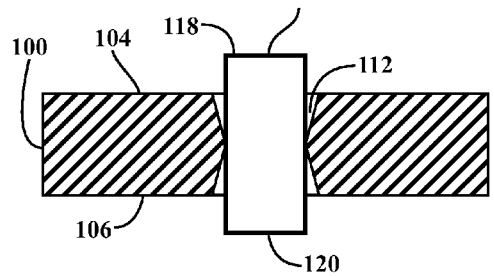
FIG. 5B is a cross-sectional view of the laser drilled hole of FIG. 5A supporting an electronic component.

As shown in FIG. 5B, the precisely controlled drilling described herein permits an electronic component 114 to be easily inserted and correctly positioned in hole 112 while being processed and easily released without damage following processing. Note that a top end surface 118 of component 114 extends above top surface 104 of silicone rubber 100 and a bottom end surface 120 of component 114 extends beyond bottom surface 106 of silicone rubber 100. This arrangement allows access to both end surfaces 118, 120 of component 114 for processing at the same time while being held securely by the silicone rubber 100, a desirable result. When it exists, the slight reduction in diameter "d" caused by tapered area 116 helps to hold component 114.

Embodiments described herein produce holes though an elastomeric material, particularly cured silicon, without molding the holes. They allow fast prototyping of new designs and reduce tooling costs by eliminating the need for mold repair and purchasing. In addition, the processes are fast enough to drill a plate design in a reasonable amount of time while not charring or otherwise degrading the silicone material. When such holes are molded, any design change requires a new mold in contrast to the teachings herein. Further, embodiments herein address the problem of mold damage that can lead to poorly formed holes requiring expensive mold repair.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method for drilling a hole in an elastomeric material to a desired diameter across a center, comprising:
   providing a laser;
   providing a memory;
   providing a processor configured to execute instructions programmed in the memory;
   initiating drilling of the hole by directing laser pulses from the laser to the to surface of the elastomeric material along a circular path formed by a non-zero innermost diameter to sever a central portion from the elastomeric material, the central portion extending from the top surface to a bottom surface and about the center to the innermost diameter before directing the laser pulse to form a first pattern;
   directing, using the laser under control of the processor executing instructions stored in the memory, laser pulses from the laser to the top surface of the elastomeric material in a plurality of passes in a direction proceeding from the non-zero innermost diameter to the desired diameter or from the desired diameter to the non-zero innermost diameter, the plurality of passes forming the first pattern such that a successive pass of the plurality of passes overlaps a previous pass of the plurality of passes; and
   repeating, using the laser under control of the processor executing instructions stored in the memory, the first pattern without changing the direction or repeating the first pattern while reversing the direction until the hole is formed through the bottom surface of the elastomeric material.

2. The method of claim 1 wherein a step size between successive passes of the laser pulses forming the first pattern is between 5 and 50 microns.

3. The method of claim 1 wherein removing the central portion comprises one of:
   laser drilling about a path formed by the innermost diameter until the central portion is severed from the elastomeric material; or
   directing the laser pulses from the laser to the top surface of the elastomeric material in an initial plurality of passes in a direction proceeding from near or at the center to the innermost diameter, the initial plurality of passes forming a second pattern such that a successive pass of the initial plurality of passes overlaps a previous pass of the initial plurality of passes; and wherein a step size between successive passes of the initial plurality of passes is larger than a step size between successive passes of the plurality of passes forming the first pattern; or
   directing the laser pulses from the laser to the top surface of the elastomeric material in an initial plurality of passes in a direction proceeding from the innermost diameter to near or at the center, the initial plurality of passes forming the second pattern such that the successive pass of the initial plurality of passes overlaps the previous pass of the initial plurality of passes;
   and wherein the step size between successive passes of the initial plurality of passes is larger than the step size between successive passes of the plurality of passes forming the first pattern.

4. The method of claim 3, further comprising:
   repeating the second pattern until the central portion is severed from the elastomeric material.

5. An apparatus for drilling a hole in an elastomeric material to a desired diameter across a center, comprising:
   a laser;
   a memory; and
   a processor configured to execute instructions programmed in the memory to:
   initiate drilling of the hole by directing laser pulses from the laser to a to surface of the elastomeric material along a circular path formed by a non-zero innermost diameter to sever a central portion from the elastomeric material before directing the laser pulses to form a first pattern, the central portion extending from the top surface to a bottom surface and about a center to the innermost diameter;

direct laser pulses from the laser to the top surface of the elastomeric material in a plurality of passes in a direction proceeding from the non-zero innermost diameter to the desired diameter or from the desired diameter to the non-zero innermost diameter, the plurality of passes forming the first pattern such that a successive pass of the plurality of passes overlaps a previous pass of the plurality of passes; and repeat the first pattern without changing the direction or repeat the first pattern while reversing the direction until the hole is formed through the bottom surface of the elastomeric material.

6. The apparatus of claim 5 wherein the innermost diameter is greater than 50% of the desired diameter.

7. The apparatus of claim 5 wherein the first pattern forms a spiral pattern from the innermost diameter to the desired diameter or from the desired diameter to the innermost diameter.

8. The apparatus of claim 5 wherein the first pattern forms concentric circles about the center from the innermost diameter to the desired diameter or from the desired diameter to the innermost diameter.

9. The apparatus of claim 5 wherein the elastomeric material is a silicone rubber material and the laser has parameters comprising:
a pulse width of 20 microseconds;
a laser power of 15 Watts;
a pulse repetition rate of 10 kHz; and
a wavelength in the IR region.

10. The apparatus of claim 5 wherein the desired diameter is greater than about 1 mm, the innermost diameter is about 800 microns, a step size between the successive passes is about 5-15 microns, and a spot size of the laser is about 80 microns.

11. The apparatus of claim 5 wherein the hole has a desired diameter of about 350 microns to about 850 microns.

12. The apparatus of claim 5 wherein the elastomeric material has a thickness ranging from about 750 microns to about 1500 microns.

13. The apparatus of claim 5 wherein the hole has a taper of less than about 25 microns.

14. The apparatus of claim 5 wherein the laser is a $CO_2$ laser having parameters comprising:
a pulse width of 20 microseconds;
a power of 15 Watts;
a pulse repetition rate of 10 kHz; and
a wavelength in the IR region.

15. The apparatus of claim 5 wherein a step size between successive passes of the laser pulses forming the first pattern is between 5 and 15 microns.

16. The apparatus of claim 5 wherein the processor is configured to control the laser to form one of a laser spot having a diameter greater than a step size between successive passes of the laser pulses or a circular or trepan laser pattern with a diameter greater than the step size between successive passes of the laser pulses.

17. An apparatus for drilling a circular hole in an elastomeric material to a desired diameter across a center, comprising:
a laser;
a memory; and
a processor configured to execute instructions programmed in the memory to:
initiate drilling of the hole by directing laser pulses from the laser to a top surface of the elastomeric material in a plurality of consecutive passes, each consecutive pass proceeding in a direction commencing from a non-zero innermost diameter and ending at the desired diameter or commencing from the desired diameter and ending at the non-zero innermost diameter, the plurality of consecutive passes forms a spiral pattern from the innermost diameter to the desired diameter or from the desired diameter to the non-zero innermost diameter, wherein a successive pass of the plurality of consecutive passes overlaps a previous pass of the plurality of consecutive passes; and
repeat the spiral pattern without changing the direction or repeat the spiral pattern while reversing the direction until the hole is formed through a bottom surface of the elastomeric material, wherein the plurality of consecutive passes produces an annular hole severing a central portion from the elastomeric material.

18. The apparatus of claim 17, wherein the central portion extends from the top surface to the bottom surface and about the center to the innermost diameter.

19. The apparatus of claim 17, wherein the plurality of consecutive passes includes a circular pattern made along a path coinciding with the innermost diameter.

20. The apparatus of claim 17, wherein the plurality of consecutive passes includes a circular pattern made along a path coinciding with the desired diameter.

* * * * *